United States Patent
Yoo (10) Patent No.: US 11,809,550 B2
(45) Date of Patent: Nov. 7, 2023

(54) ELECTRONIC DEVICE AND CONTROL METHOD THEREFOR

(71) Applicant: Samsung Electronics Co., Ltd., Suwon-si (KR)

(72) Inventor: Sungbae Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 17/286,998

(22) PCT Filed: Sep. 11, 2019

(86) PCT No.: PCT/KR2019/011792
§ 371 (c)(1),
(2) Date: Apr. 20, 2021

(87) PCT Pub. No.: WO2020/105854
PCT Pub. Date: May 28, 2020

(65) Prior Publication Data
US 2021/0390176 A1    Dec. 16, 2021

(30) Foreign Application Priority Data

Nov. 19, 2018 (KR) .......................... 10-2018-0142782

(51) Int. Cl.
*G06F 21/00* (2013.01)
*G06F 21/54* (2013.01)
(Continued)

(52) U.S. Cl.
CPC ............ *G06F 21/54* (2013.01); *G06F 21/554* (2013.01); *G06F 21/572* (2013.01)

(58) Field of Classification Search
CPC ....... G06F 21/572; G06F 21/554; G06F 21/54
(Continued)

(56) References Cited

U.S. PATENT DOCUMENTS 7,734,600 B1 *   6/2010   Wise .................... G06F 21/6218
                                                           707/661
8,997,244 B2     3/2015   Fang et al.
(Continued)

FOREIGN PATENT DOCUMENTS

CN          104133726 A       11/2014
JP            6058246 B2        1/2017
(Continued)

OTHER PUBLICATIONS

Bruno Morisson, Analysis of the Linux Audit System, Technical Report, RHUL-MA-2015-13, Apr. 1, 2015, Information Security Group, Royal Holloway University of London, United Kingdom.
(Continued)

*Primary Examiner* — Josnel Jeudy
(74) *Attorney, Agent, or Firm* — Jefferson IP Law, LLP (57) ABSTRACT

Provided in the present disclosure are an electronic device and a control method therefor. An electronic device of the present disclosure comprises a memory in which a kernel and at least one application are stored, and a processor, which generates a first rule for determining a time at which the application calls a system in order to execute a process, determines, on the basis of the first rule, whether the application corresponds to an application for which security is verified, and generates a second rule for skipping an audit on the basis of a plurality of pre-defined rules, if the application corresponds to the application for which security is verified.

11 Claims, 8 Drawing Sheets

(51) Int. Cl.
*G06F 21/55* (2013.01)
*G06F 21/57* (2013.01)

(58) Field of Classification Search
USPC .......................................................... 726/22
See application file for complete search history.

(56) References Cited

U.S. PATENT DOCUMENTS

| | | |
|---|---|---|
| 9,015,832 B1 | 4/2015 | Lachwani et al. |
| 9,047,466 B2 | 6/2015 | Zhou et al. |
| 9,552,481 B1* | 1/2017 | Guo ..................... G06F 21/54 |
| 2010/0142756 A1* | 6/2010 | Fields .................... G07D 7/206 |
| | | 382/100 |
| 2011/0126205 A1 | 5/2011 | Gaist |
| 2015/0271181 A1* | 9/2015 | Mendel .................. H04L 63/10 |
| | | 726/4 |
| 2017/0277887 A1 | 9/2017 | Ijiro et al. |
| 2018/0121484 A1 | 5/2018 | Gerashchenko et al. |

FOREIGN PATENT DOCUMENTS

| | | | |
|---|---|---|---|
| KR | 1999-0048880 A | 7/1999 | |
| KR | 10-2017-0087116 A | 7/2017 | |
| KR | 10-2017-0090645 A | 8/2017 | |
| KR | 10-1790761 B1 | 10/2017 | |
| WO | WO-2015014259 A1 * | 2/2015 | ........... G06F 21/562 |

OTHER PUBLICATIONS

Chapter 7. System Auditing, Red Hat Customer Portal, https://access.redhat.com/documentation/en-us/red_hat_enterprise_linux/6/html/security_guide/chap-system_auditing (retrieved on Jun. 26, 2018).

Lei Zeng et al., Auditing overhead, auditing adaptation, and benchmark evaluation in Linux, Published online Jun. 4, 2015 in Wiley Online Library (wileyonlinelibrary.com). DOI: 10.1002/sec.1277.

Introducing Linux Audit System (Techint, Apr. 27, 2017).

* cited by examiner

ELECTRONIC DEVICE AND CONTROL METHOD THEREFOR

TECHNICAL FIELD

This disclosure relates to an electronic device and a control method thereof. More particularly, this disclosure relates to an electronic device for performing an audit for an application and a control method thereof.

BACKGROUND ART

In accordance with the development of an electronic communication technology, a security technique for preventing hacking or personal information leakage is being developed while a wireless communication technology is widely used.

Recently, an operating system which is executed in an electronic device may include a security-related system.

Figure 1:
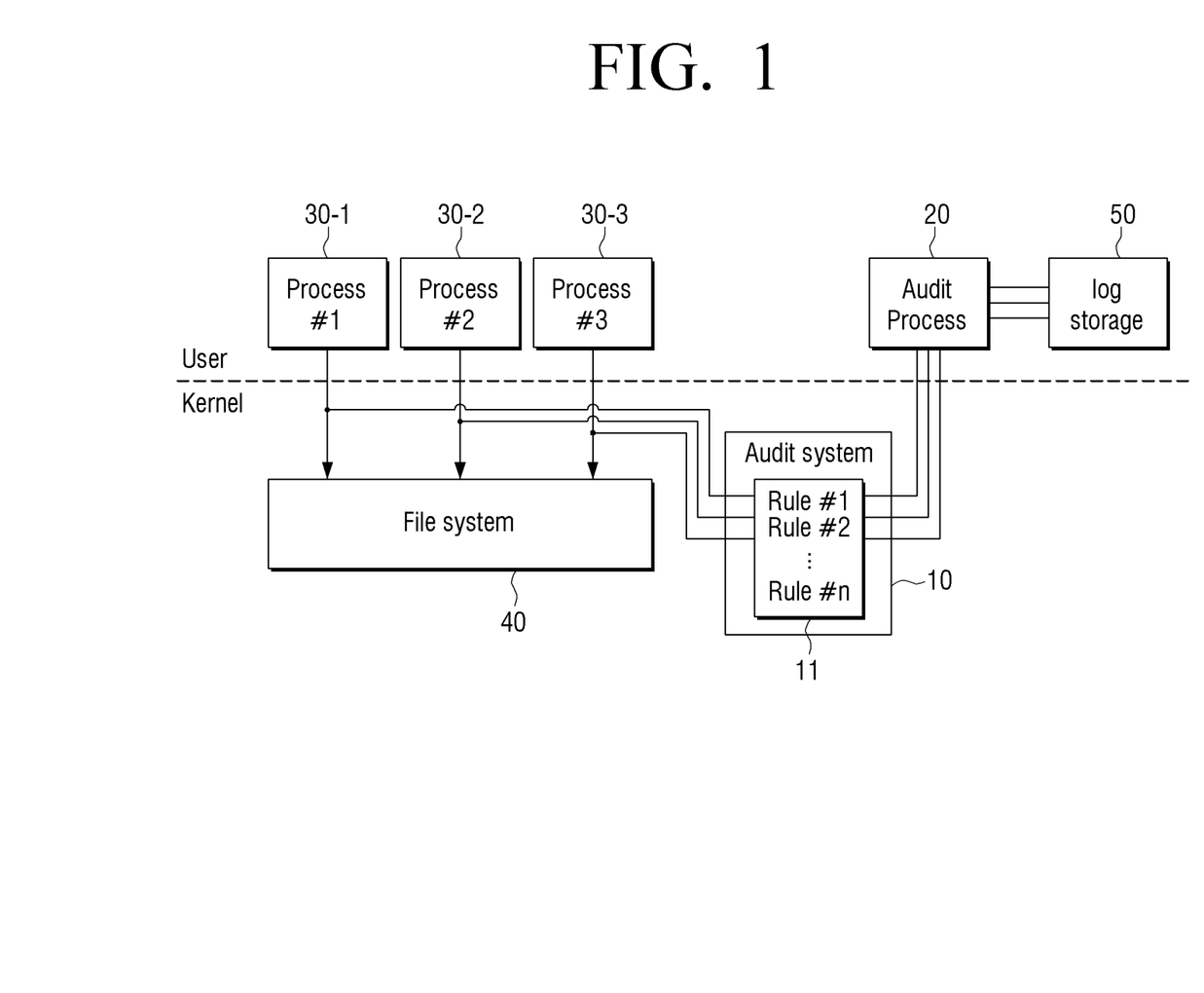
FIG. 1 is a diagram illustrating a related-art electronic device.

FIG. 1 is a diagram illustrating a related-art electronic device including an audit system among security-related systems.

The electronic device may monitor processes 30-1 to 30-3 by an application running on the electronic device using an audit system 10. When an event, such as a system call, is generated in the processes 30-1 to 30-3 running on the electronic device, the electronic device may use the audit system 10 to generate a log including a lot of information about the event. The electronic device may identify whether an event violating the security policy of the electronic device has occurred by using the generated log.

To this end, the audit system 10 includes a plurality of rules 11 to generate a log when a preset event is generated.

When the process 30-1 to 30-3 executed by the application generates an event such as a system call to access a file system 40, the electronic device may perform audit for the corresponding event using a plurality of predetermined rules 11 included in the audit system 10.

Specifically, when a system call is generated in a process executed by an application, an audit process 20 of the electronic device may sequentially traverse a plurality of predetermined rules 11 included in the audit system 10 and perform audit for the system call. When the generated event corresponds to a condition included in any one rule among a plurality of predetermined rules, the audit process 20 may leave a log for the corresponding rule.

The generated log may be stored in a log storage 50, and the electronic device may obtain information about the system call generated by the processes 30-1 to 30-3 with reference to the log stored in the log storage 50.

The plurality of rules preset in the audit system 10 are globally predefined rules, and the electronic device may use the audit process 20 to traverse a plurality of preset rules for each of the processes 30-1 to 30-3 executed by the application.

In this example, the higher the predetermined number of rules, the higher the log which the audit process 20 should record and store for one process, and the system may take much time to analyze the log and thus, overhead of the system may increase.

As the plurality of predetermined rules are smaller, the log which the audit process 20 records and stores for one process may become less, and the system may require less time to analyze the log, but there is a problem that the security of the system is vulnerable.

DISCLOSURE

Technical Problem

The disclosure has been made to solve the above-described problems, and an object of the disclosure is to provide an electronic device for skipping an audit for a process performed by a security-verified application and performing an audit only for an unreliable process and a control method thereof.

Technical Solution

An electronic device according to an embodiment includes a memory configured to store a kernel and at least one application and a processor configured to, based on a system call generated by a process executed by the application being transmitted to the kernel, execute the application to cause the application to perform an operation corresponding to a request generated by the kernel based on the system call.

The kernel may perform an audit for the system call based on a plurality of predefined rules.

The processor may generate a first rule to identify a point in time of a system call generated by the application to perform the process, identify whether the application corresponds to a security-verified application based on the first rule, and based on the application corresponding to the security-verified application, generate a second rule to skip the audit based on the plurality of predefined rules.

The processor may, based on a log for the system call being generated by the first rule, skip the audit based on the plurality of predefined rules according to the second rule.

The processor may add the first rule prior to the plurality of predefined rules, and based on identification that the application corresponds to the security-verified application by the first rule, add the second rule prior to the plurality of predefined rules to skip the audit based on the plurality of predefined rules by the second rule.

The first rule may include a rule of generating a log based on the application performing the system call to perform the process, and the processor may, based on the log for the system call being generated based on the first rule, generate the second rule.

The processor may perform security verification for at least one application stored in the memory, generate a list including information about the at least one security-verified application, among the at least one application, and store the list in the memory.

The processor may identify whether the application performing the process corresponds to the security-verified application based on the list.

The processor may generate a third rule to monitor modulation for at least one security-verified application stored in the list.

The processor may, based on modulation for the application being identified according to the third rule, delete information about the application of which modulation is identified from the list.

The processor may generate the third rule to generate a log, based on the modulation for the at least one security-verified application included in the list being identified, and identify that the application included in the log generated according to the third rule, among the at least one security-verified application included in the list, is modulated.

A control method of an electronic device according to an embodiment includes generating a first rule to identify a point in time of a system call generated by an application to perform a process, transmitting a system call generated by the process executed by the application to a kernel, based on the application corresponding to the security-verified application based on the first rule, generating a second rule to skip an audit based on a plurality of predefined rules, and performing an operation corresponding to a request generated by the kernel based on the system call.

The kernel may perform an audit for the system call based on a plurality of predefined rules.

The method may further include, based on the log for the system call being generated by the first rule, skipping the audit based on the plurality of predefined rules according to the second rule.

The method may further include adding the first rule prior to the plurality of predefined rules, and based on identification that the application corresponds to the security-verified application by the first rule, adding the second rule prior to the plurality of predefined rules to skip the audit based on the plurality of predefined rules according to the second rule.

The first rule may include a rule of generating a log based on the application performing the system call to perform the process.

The generating the second rule may include, based on the log for the system call being generated based on the first rule, generating the second rule.

The method may further include performing security verification for at least one application stored in the electronic device, generating a list including information about the at least one security-verified application, among the at least one application, and storing the list in the electronic device.

The method may further include identifying whether the application performing the process corresponds to the security-verified application based on the list.

The method may further include generating a third rule to monitor modulation for at least one security-verified application stored in the list.

The method may further include, based on modulation for the application being identified according to the third rule, deleting information about the application of which modulation is identified from the list.

The method may include generating the third rule to generate a log, based on the modulation for the at least one security-verified application included in the list being identified.

The method may further include identifying that the application included in the log generated according to the third rule, among the at least one security-verified application included in the list, is modulated.

Effect of Invention

According to various embodiments as described above, an electronic device may reduce an overhead while maintaining security of a system by skipping an audit for a process which is executed by a security-verified application.

MODE FOR CARRYING OUT THE INVENTION

After terms used in the present specification are briefly described, the disclosure will be described in detail.

General terms that are currently widely used may be selected as terms for describing the embodiments of the disclosure in consideration of functions in the disclosure, but other terminology may be understood based on the intention of those skilled in the art of the disclosure, the emergence of a new technique, and the like. In addition, in a specific configuration, additional terms may be selected herein. In this configuration, the meaning of such terms may be mentioned in detail in a corresponding portion of the disclosure. Therefore, the terms used in embodiments of the disclosure should be defined based on the meaning of the terms and the contents throughout the disclosure rather than simply the names of the terms.

The example embodiments are capable of various modifications and have various embodiments, and specific embodiments are illustrated in the drawings and described in detail in the description. It should be understood, however, that it is not intended to limit the scope of the embodiments but includes all modifications, equivalents, and alternatives falling within the scope of the disclosure. When it is decided that a detailed description for the known art related to the disclosure may unnecessarily obscure the gist of the disclosure, the detailed description may be omitted.

As used herein, the terms "first," "second," or the like may be used to refer to corresponding components, regardless of importance of order, and may be used to distinguish a component from another without limiting the components.

A singular expression includes a plural expression, unless otherwise specified. It is to be understood that the terms such as "comprise" or "consist of" are used herein to designate a presence of a characteristic, number, step, operation, element, component, or a combination thereof, and these terms do not to preclude a presence or a possibility of adding one or more of other characteristics, numbers, steps, operations, elements, components or a combination thereof.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module and be realized in at least one processor.

Hereinafter, various example embodiments of the disclosure will be described in greater detail with reference to the accompanying drawings. However, the present disclosure may be implemented in various different forms, and the disclosure is not limited to only the embodiments described herein. In addition, in the drawings, portions unrelated to the description may be omitted to avoid obscuring the disclosure, and similar elements will be denoted by similar reference numerals throughout the disclosure.

An application according to embodiments may refer to a software which is executed on an operating system (OS) for a computer or mobile OS and used by a user. For example, the application may include a web browser, a camera application, a mobile payment application (or electronic payment application, payment application), a photo album application, a word processor, a spread sheet, a contacts application, a calendar application, a memo application, an alarm application, a social network system (SNS) application, a call application, a game store, a game application, a chatting application, a map applications, a music players, a video players, or the like.

The application according to embodiments may refer to software executed in an external device or an external device connected to the electronic device by wire or wirelessly (e.g., a wearable device, a server, etc.), or the like.

The electronic device according to various embodiments may include at least one of, for example, and without limitation, a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer 3 (MP3) player, a mobile medical device, a camera, or a wearable device. According to various embodiments, the wearable device may include at least one of an accessory type (e.g., a watch, a ring, a bracelet, a wrinkle bracelet, a necklace, a pair of glasses, a contact lens or a head-mounted-device (HMD), or the like), a fabric or a garment-embedded type (e.g., an electronic clothing, or the like), a skin-attached type (e.g., a skin pad or tattoo), or bio-implantation type (e.g., implantable circuit).

In some embodiments, the electronic device may be a home appliance. The home appliance may be, for example, a television, a digital video disc (DVD) player, audio, refrigerator, cleaner, ovens, microwaves, washing machines, air purifiers, set top boxes, home automation control panels, security control panels, television (TV) box (e.g., SAMSUNG HOMESYNC™, APPLE TV™, or GOOGLE TV™), game consoles (e.g., XBOX™, PLAYSTATION™), electronic dictionary, electronic key, camcorder, or electronic frame.

In other embodiments, the electronic device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), a navigation system, a global navigation satellite system (GNSS), an event data recorder (EDR), a flight data recorder (FDR), an automotive infotainment devices, a marine electronic equipment (e.g., marine navigation devices, gyro compasses, etc.), avionics, a security device, a car head unit, industrial or domestic robots, a drone, an automated teller machine (ATM), a point of sale (POS) of a store, or an Internet of Things (IoT) device (e.g., light bulbs, sensors, sprinkler devices, fire alarms, thermostats, street lights, toasters, exercise equipment, hot water tanks, heater, boiler, etc.).

According to various embodiments, the electronic device may be implemented as a part of furniture or building/structure, an electronic board, an electronic signature receiving device, a projector, any of various measuring devices (e.g., water, electricity, gas, or electromagnetic wave measuring devices, or the like), or the like. In various embodiments, the electronic device may be one or a combination of the various devices described above. The electronic device according to an embodiment is not limited to the devices described above, and may include a new electronic device according to technology development.

Various embodiments of the disclosure will be described in greater detail with reference to drawings.

Figure 2:
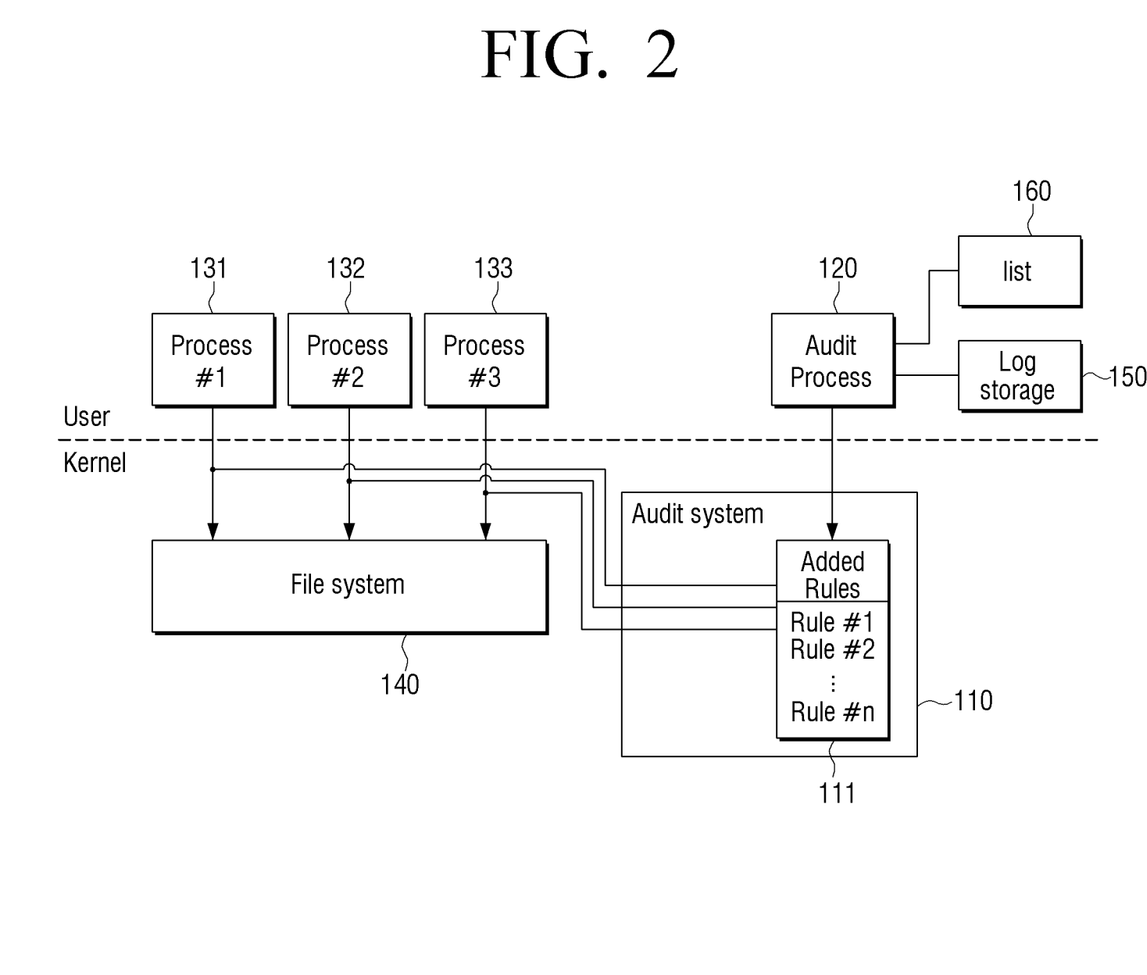
FIG. 2 is a diagram illustrating an electronic device according to various embodiments.

FIG. 2 is a diagram illustrating an electronic device according to various embodiments. To be specific, FIG. 2 illustrates an electronic device including an audit system 110.

An electronic device 1000 may audit processes 131-133 executed by the application using the audit system 110 included in a kernel. If the processes 131 to 133 executed by the application access the file system 140 on the kernel through the system call, the electronic device may generate log information including information about the system call by sequentially using a plurality of rules included in the audit system 110, and may store the generated log information in the log storage 150. The electronic device may obtain information about a system call in which processes 131 to 133 are generated by using log information stored in the log storage 150, and may audit the process.

The plurality of rules included in the audit system 110 may include a plurality of rules pre-defined in the audit system 110 and a rule added by the electronic device 1000.

The electronic device 1000 may add the rule to audit the process to the audit system 110 using the audit process.

The electronic device 1000 may store a list of applications that are determined to be safe from an intrusion of a virus or a hacker among applications included in the electronic device 1000, and may add a rule for an application included in the list to the audit system 110.

The list may include identification information of the security-verified application, a path in which the execution file of the application is stored, or the like.

The electronic device 1000 may generate a rule for determining the execution of the security-verified application included in the list using the audit process 120, and add the rule to a set of predetermined rules of the audit system 110. In this example, if the execution of the application included in the list is determined by the added rule, the electronic device 1000 may additionally add a rule to the audit system 110 to skip audit for the process executed by the security-verified application.

The electronic device 1000 may generate a rule to monitor modulation of the application included in the list by using the audit process 120 and may add the rule to the set of the preset rule of the audit system 110.

The modulation of the application may indicate that a binary code of the file associated with execution of the application is changed by an unauthorized user or system. That is, the user or the system having no authority for the application may add a change to the file associated with the application, and the modulation by a malicious code or a hacker may correspond thereto.

If the application of the application is identified by the rule for auditing the modulation of the application, the electronic device may delete the information about the corresponding application from the list in that the application is no more a security-secured application. When an application deleted from the list is executed, the electronic device may audit an application deleted from the list using a plurality of predefined rules included in the audit system 110.

The electronic device 1000 may reduce the audit for the process performed in the system and reduce time and overhead required to analyze the generated log information as a result of the audit by omitting the audit for the process executed by a reliable application and performing an audit for only the process executed by an unreliable application. Accordingly, the efficiency of the system of the electronic device may be increased.

The electronic device according to various embodiments will be described in detail.

Figure 3:
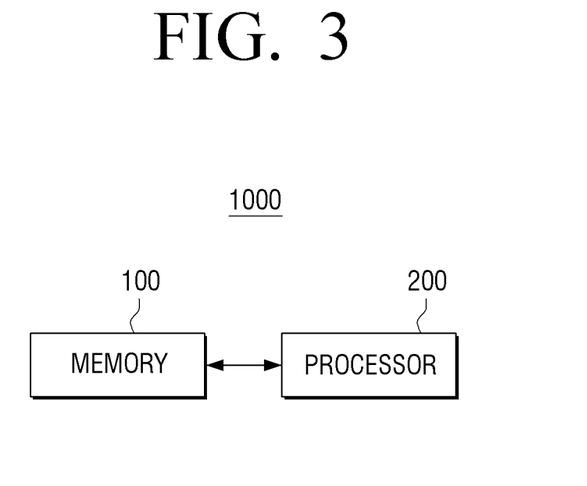
FIG. 3 is a block diagram illustrating an electronic device according to an embodiment.

FIG. 3 is a block diagram illustrating an electronic device according to an embodiment.

Referring to FIG. 3, the electronic device 1000 may include a memory 100 and a processor 200.

The memory 100 may store various programs and data necessary for the operation of the electronic device 1000. The memory 100 may store various data generated during program execution, including a program necessary for execution of at least one application installed in the electronic device 1000.

The memory 100 may include a program region and a data region. Associated information for driving the electronic device 1000, such as an operating system booting the electronic device 1000, may be stored in the program region. Various data transmitted and received during a program execution may be stored in the data region.

The memory 100 may store a kernel and at least one application. The kernel is a program included in an operating system installed in the electronic device and may serve to control all systems on the electronic device. If not including the kernel in accordance with the operating system, a program that controls all systems on the electronic device may correspond to the kernel of the disclosure.

The memory 100 may include at least one of a user region, a kernel region, or a hardware region, and may include at least one application or a process executed by at least one application, a container, or the like.

The user region of the memory 100 may include the log storage 150 for storing log information generated by various systems in the kernel region. For example, the memory 100 may include the log storage 150 including log information generated by a plurality of rules included in the audit system 110.

The user region may include a list 160 that includes information about the security-verified application among the applications included in the electronic device 1000. As described above in FIG. 2, the information on the security-verified application may include identification information of the security-verified application, a path in which the execution file of the application is stored, or the like.

The kernel region may include a file system 140, an audit system 110, a memory management system (not shown), or the like. The file system 140 may include a native file system and a virtual file system, or the like, as a system for managing all files stored in the memory 100. The audit system 110 may also represent a system that audits all attempts to access the file system 140.

The audit system 110 may store a plurality of rules that audit a system call to access the file system 140 in the electronic device 1000. In this example, the plurality of rules may be physically or sequentially connected, and when one system call is generated, a plurality of rules stored in the audit system 110 may be sequentially used.

The hardware region may include a physical region in which data related to function of at least one application installed in the electronic device 1000 or a system object such as at least one folder or directory including data is actually stored. For example, a hardware region of the memory 100 may include a flash memory, a hard disk, a multimedia card, a micro-type memory (e.g., a secure digital (SD) or an extreme digital (XD) memory), a random access memory (RAM), a read only memory (ROM), or the like.

The processor 200 may be electrically connected to the memory 100 and may control an overall operation and function of the electronic device 1000.

The processor 200 may execute an application stored in the memory 100 of the electronic device 1000. Once the application is executed, a process associated with the application may be generated and executed. The process may represent a task executed in the electronic device by the application, each of the plurality of applications may generate and execute a plurality of processes, and one application may generate and execute a plurality of processes.

If the system call generated by the process executed by the application is transmitted to the kernel, the processor 200 may execute an application so that the application can perform an operation corresponding to the request generated in the kernel based on the system call.

The system call may refer that the process requests to the kernel of the operating system to perform a specific operation, and the system call may be divided into a process control system call, a file management system call, a device management system call, an information management system call, a communication system call, or the like. The process control system call is a system call for creating, loading, executing, ending, or the like, of the process, the file management system call may be a system call for creation, opening, closing, reading, writing, deleting, saving, or the like, and the device management system call may be a system call for requesting, releasing, reading, writing, and reposition of the device. The information management system call may be a process for setting and obtaining system data, such as time, date, etc., the communication system call may be a system call for creation and removal of a communication connection, message transmission/reception, status information forwarding, or the like.

If a system call is generated by the process executed by the application, the system call may be the system call of the disclosure. The system call of the disclosure may be a process control system call, a device management system call, an information management system call, or the like, without being limited to a file management system call.

If the system call is transmitted to the kernel, the kernel may perform audit for the system call based on a plurality of predefined rules. The audit system 110 included in the kernel may perform audit for the system call using a plurality of pre-defined rule included in the audit system 110.

The plurality of pre-defined rules are to identify whether a system call generated by the process matches a preset condition, and may include information such as a target, a condition, or a response when matched with a condition, or the like.

The "target" among the information included in the rule may indicate a system call number generated in the process, and "condition" may indicate information such as a process ID (PID), a process name, and a path of a file handled by the process, or the like. The path of the file handled by the process may mean a path of a file to be accessed by the process for opening, writing, saving, or the like.

The "response when matched with a condition" may represent whether to leave a log if the system call number and condition forwarded to the kernel match the system call number and condition included in the rule.

The audit system 110 may sequentially traverse a plurality of predefined rules. If the system call generated by the process matches the target and information included in the log, the monitoring system 110 may leave the log information according to the rule. The log information may include various information such as a system call number, a condition, a time when the system call is generated, or the like.

The processor 200 may obtain the information about the system call called by the processor using the log information and may audit the system in the electronic device based on the information.

The processor 200 may add the at least one rule related to the system call executed by the processor to the audit system 110. The audit system 110 may perform audit on the system call by using a rule added by the processor 200, in addition to the predetermined rule.

Figure 5:
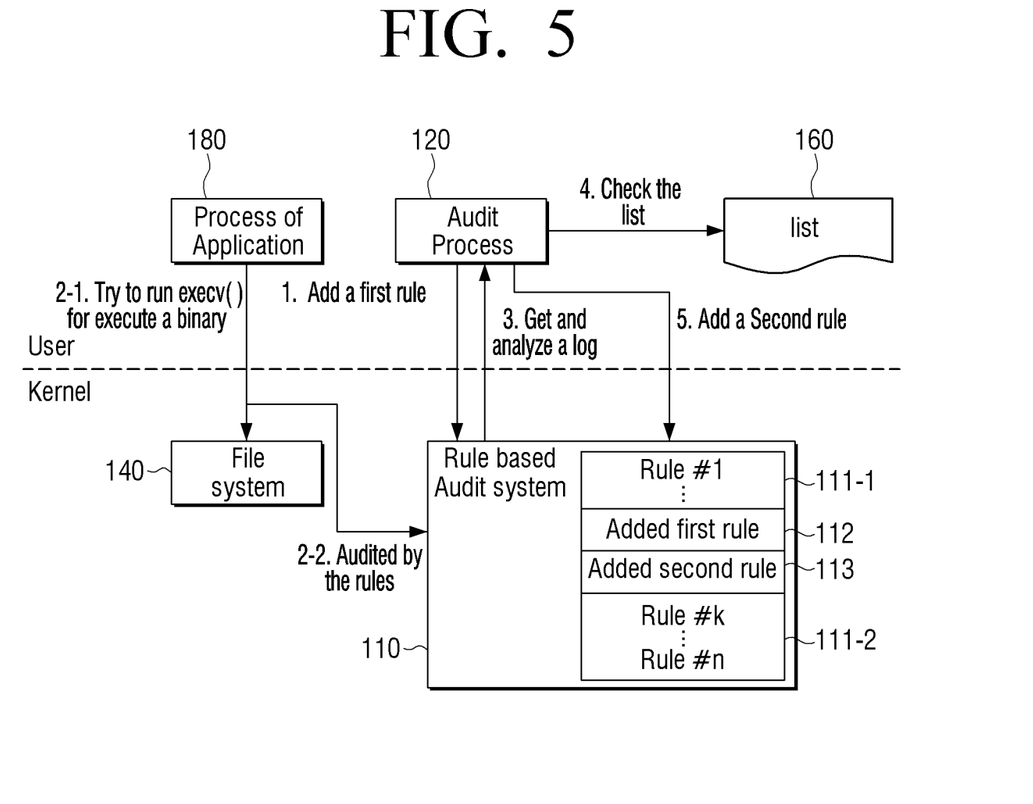
Figure 6:
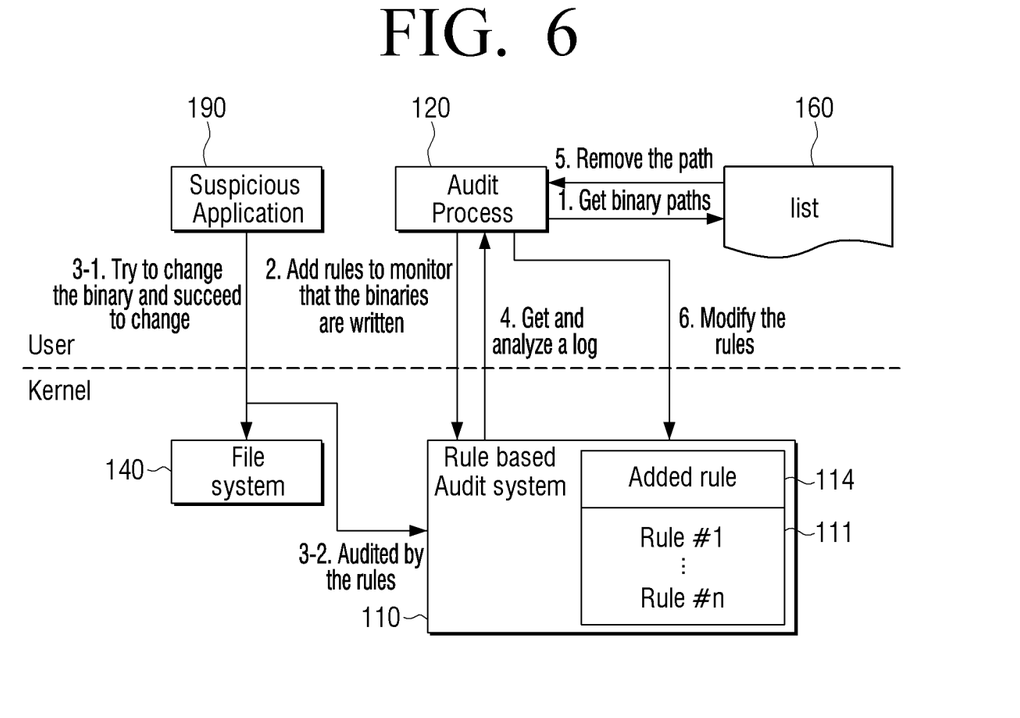

FIGS. 5 and 6 illustrate an electronic device performing audit by using a rule added by the processor 200 according to an embodiment.

FIG. 5 illustrates an electronic device for auditing a system by adding a rule to identify a point in time when the process is executed by the application and a rule for skipping at least one rule among a plurality of rules presorted in the audit system.

The processor 200 may generate a first rule 112 to identify a point in time of system call to execute a process by the application.

If the application executes the process, the process may forward the system call (e.g., execv( )) to the file system 140 included in the kernel.

The processor 200 may use the audit process 120 stored in the memory 100 to generate the first rule 112 that identifies a point in time when an application calls the system to execute the process. The first rule 112 may include a rule in which a log associated with the system call is generated when the application performs a system call to execute the process.

When the application performs a system call to execute the process, the first rule 112 may generate a log including information such as a system call number, a process ID, a path of a file handled by the process, time when the system call is generated, or the like.

The processor 200 may identify whether the application performing the system call based on the first rule 112 corresponds to a security-verified application. Specifically, the processor 200 may analyze the log using the audit process 120 when a log for the system call performed by the first rule 112 is generated, and may identify whether the application executing the process corresponding to the log corresponds to the security-verified application.

The processor 200 may identify whether an application executing the process corresponds to a security-verified application based on the list 160 for the security-verified application stored in the memory 100. The processor 200 may match the process information included in the log information and the information related to the application executing the process with the list 160 for the security-verified application stored in the memory 100 to identify whether the application executing the process corresponds to the security-verified application.

If the application performing the system call corresponds to the security-verified application, the processor 200 may generate the second rule 1130 to skip the audit based on the plurality of pre-defined rules included in the audit system 110.

The processor 200 may add the generated first rule 112 and the second rule 113 to a plurality of predefined rules 111-1 and 111-2. The audit process 120 may add the first rule and the second rule in front of the plurality of rules 111-1 and 111-2 predefined in the audit system 110, thereby allowing the audit system 110 to audit the process using the first rule before the predefined plurality of rules 111-1 and 111-2. This is merely an embodiment, and the audit process 120 may add the first rule and the second rule between a plurality of rules 111-1 and 111-2 predefined in the audit system 110.

The processor 200 may add the first rule 112 prior to the predefined plurality of rules 111-2 and if it is identified that the application corresponds to the security-secured application by the first rule 112, the processor 200 may add the second rule 113 prior to the predefined plurality of rules 111-2 to skip audit based on a plurality of predefined rules by the second rule 113.

The processor 200 may add the first rule 112 and the second rule 113 to a plurality of predefined rules, grasp a point in time when the application performs a system call and an application to perform a system call to execute the process using the first rule prior to performing the audit for the system call by using a plurality of predefined rules, and if the application performing the system call corresponds to the security-verified application, the processor 200 may omit audit using a plurality of predefined rules using the second rule.

Referring to FIG. 5, the processor 200 may perform operations in a following order.

1. A rule to monitor a process for executing a system call using the audit process 120 is added to the audit system 110.
2. When the process 180 of the application executes the system call and access the file system 140, a process executing the system call is audited by using the first rule.
3. The audit process 120 obtains a log record from the first rule and analyzes the obtained record.
4. By checking the list 160, whether the application of the process executing the system call is a verified application is identified.

If the application of the process executing the system call is a verified application, the second rule to skip the predefined plurality of rules may be added.

FIG. 6 is a diagram illustrating an electronic device for auditing a system by adding a rule to audit modulation of an application according to an embodiment.

The processor 200 may generate a third rule for monitoring modulation for at least one application that has been securely verified, included in the verified application list. The processor 200 may generate the third rule for monitoring whether a system call to attempt to write to a file or program associated with the application is generated in that the modulation for the application is performed through writing to a file or program associated with the application. The file or program related to the application may include an execution program executing an application, a file for setting or changing an authority for the application, or the like.

The processor 200 may first obtain a path of an application from a list of verified applications using the audit process 120. The path of the application may indicate a file or program related to execution of the application, a file or program for determining or changing the authority for the application, or a location at which the file or program for determining or changing the authority for the application is stored in the memory 100.

The processor 120 may, based on modulation for at least one security-verified application included in the list of the verified application being identified, generate the third rule to generate a log.

The processor 200 may identify that an application included in a log generated according to the third rule among at least one security-verified application included in the list of the verified application is modulated.

For example, if the A application, B application, C application, or the like, are included in the list of the verified application and information of A application is included in the log information generated according to the third rule that audits the system call related to the modulation of the application, the processor 200 may identify that the A application has been modulated using the log information generated according to the third rule.

When the modulation for the application is identified according to the third rule, the processor 200 may delete the information on the application of which modulation is applied from the list of the verified application. In that the application of which the modulation is identified according to the third rule is no longer considered as the security-verified application, the processor 200 may use the audit process 120 to delete information about the application in which modulation is identified in the list of security-verified application.

The processor 200 may modify the third rule added to the audit system 110 to correspond to a list of verified applications. The processor 200 may delete the information of the application identified as being modulated among the system call number included in the third rule, the process ID of the application, the path of the file related to the application, or the like.

The processor 200 may then audit the system call using the predefined plurality of rules sequentially if the process executing the application in which the modulation is identified performs the system call. In that the information of the application identified as being modulated has been deleted from the list of verified applications, the embodiment described above in FIGS. 5 and 6 may not be applied, and the processor 200 may audit the application identified as being modulated using the predefined plurality of rules stored in the audit system 110.

Referring to FIG. 6, the processor 200 may perform an operation in the following order.

1. Obtain the path of the security-verified application using the audit process 120.
2. Add the third rule to monitor whether the application is modulated, the application being present in the obtained path of the security-verified application.
3. Based on a suspicious application such as a malicious code modulating an application by approaching the path of the verified application, detect modulation of the application according to the third rule.
4. Obtain the log information generated according to the third rule using the audit process 120 and identify the application identified as being modulated by analyzing log information.
5. Delete the information of the application identified as being modulated from the list of the security-verified application.
6. Delete the information of the application identified as being modulated from the third rule stored in the audit system.

As described in FIGS. 5 and 6, the processor 200 may add the rule related to the system call to the audit system 110 using the list of the security-verified application. The processor 200 may generate the list of the security-verified application.

Figure 4:
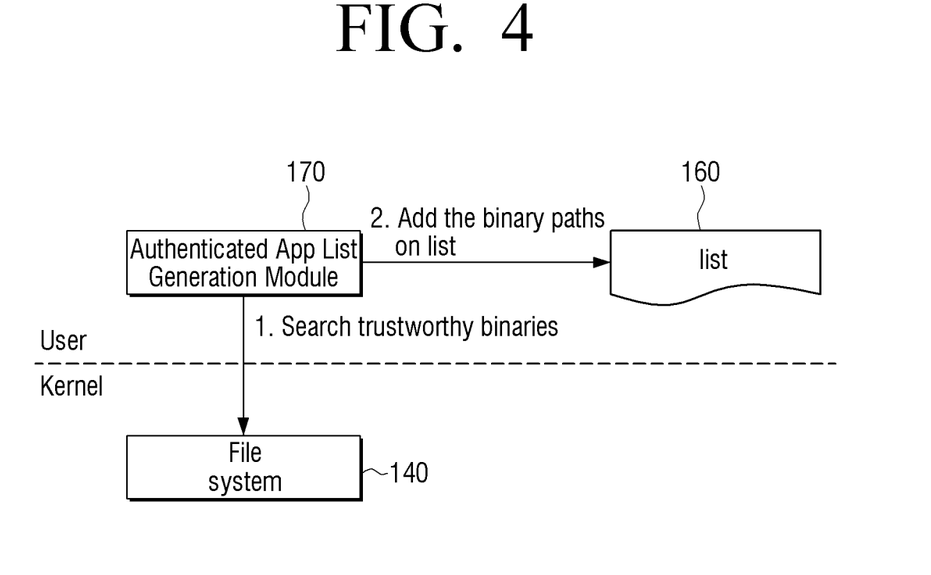
FIGS. 4 to 6 are diagrams illustrating an electronic device according to an embodiment.

FIG. 4 is a diagram illustrating an electronic device for generating a list of a security-verified application according to an embodiment.

The processor 200 may perform security verification for at least one application stored in the memory 100, generate a list including information about at least one application that has been security-verified among the at least one application, and store the list in the memory 100.

If the electronic device 1000 is booted, the processor 200 may perform security verification for the application stored in the memory 100. The security verification here indicates that the application stored in the memory 100 is compared with a predefined malicious action pattern or a malicious code to identify whether the application is suspicioned as a malicious application.

The predefined malicious behavior patterns may include, for example, leakage of an address book, message leakage, photo leakage, illegal charging, transmission of unencrypted personal information to a network, continuing secure shell (SSH) connection with a particular server, persistent encryption attempt for files of a shared directory (suspicious as Ransomware), a rapid network communication increase, a persistent attempt to change the system rights and files, compulsory termination of another application, continuous attempt of network communication by an application without network authority, causing cellular data communication, transmission of a spam message, transmission of coordinate information by an application without GPS authority via network, continuous access to a particular overseas illegal site, making an international call, exhaustion of a battery, or the like.

After performing the security verification, the processor 200 may search for files of the security-verified application using an authenticated app list generation module 170. Here, the file of the application is a file used to execute the application and may include binary file or source file.

The processor 200 may generate a list including information about at least one application that has been security-verified among at least one application stored in the memory and store the list in the memory 100. The information about the application may include identification information of an application, an execution file of an application, a path of a program, or the like, and the execution file or program of the application may include a source code or a binary code.

The processor 200 may identify whether the application executing the process corresponds to the security-verified application based on the list of security-verified application stored in the memory 100.

For example, when the application executing a particular process is included in the security-verified list, the processor 200 may identify that the application is a security-verified application. If the application is identified as a security-verified application, the processor 200 may omit audit for the security-verified application using the rules added to the audit system 100 according to FIG. 5.

If the application executing a particular process is not included in the list of the security-verified application, the application may be identified as an application for which security is not verified and thus is not safe, and audit for the application may be performed using the predefined plurality of rules of the audit system 110.

Figure 7:
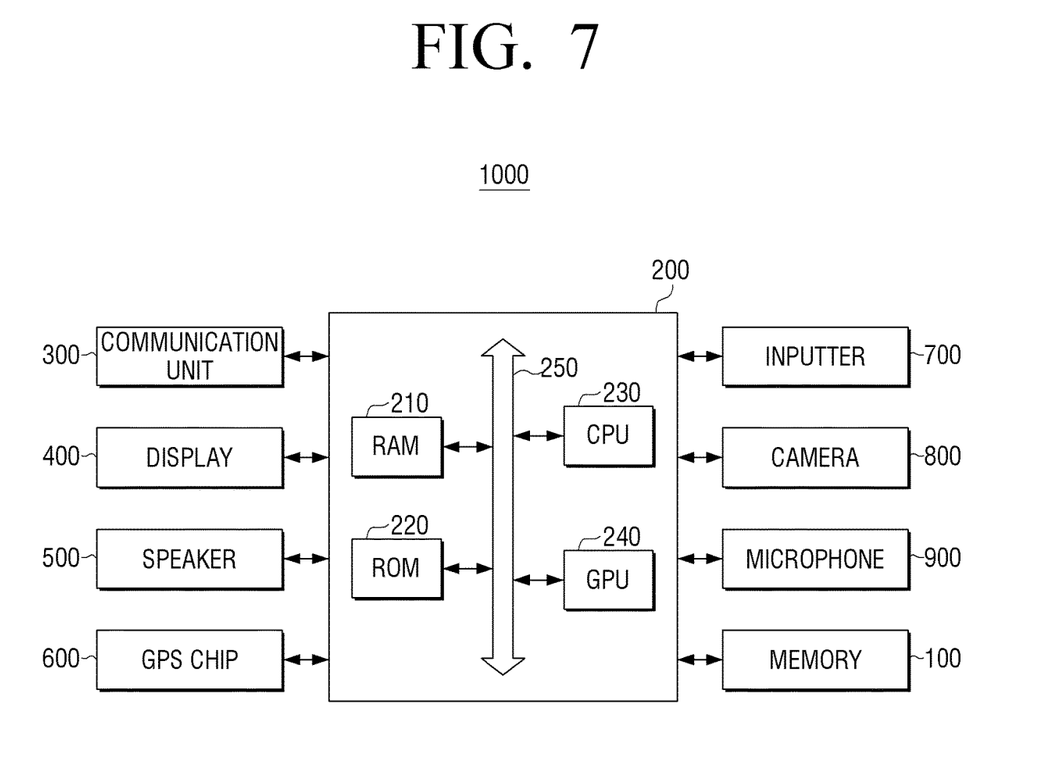
FIG. 7 is a block diagram illustrating an electronic device in detail according to an embodiment.

FIG. 7 is a block diagram illustrating an electronic device in detail according to an embodiment.

Referring to FIG. 7, the memory 100, the processor 200, a communication unit 300, a display 400, a speaker 500, a global positioning system (GPS) chip 600, an inputter 700, a camera 800, and a microphone 900 may be included. Even though not illustrated according to an embodiment type, hardware/software configurations of a level obvious to those skilled in the art may be additionally included in the electronic device 1000. Some configurations may be excluded according to an embodiment type.

The communication unit 300 may be connected to the network via wireless communication or wired communication to communicate with an external device. Wireless communication may use, as a cellular communication protocol, for example, at least one of long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. The wired communication may include, for example, near field communication. The near field communication may include at least one of, for example, wireless fidelity (Wi-Fi) direct, Bluetooth, near field communication (NFC), or Zigbee. Wired communication may include, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, a local area network (LAN) or a wide area network (WAN)), the Internet, or a telephone network.

The display 400 is configured to output an image. The display 400 may be implemented as, for example, a liquid crystal display (LCD), a light-emitting diode (LED) display, an organic light-emitting diode (OLED) display (for example, active-matrix organic light-emitting diode (AMO-LED), a passive-matrix OLED (PMOLED), a microelectromechanical systems (MEMS) display, or an electronic paper display. The touch sensor of the inputter 700 and the display 400 may form a mutual layer structure and may be implemented as a touch screen.

The speaker 500 is configured to output audio. For example, the speaker 500 may output various information such as information about suspicious application, isolation of application, release of isolation, or the like, as sound.

The global positioning system (GPS) chip 600 is configured to receive a GPS signal from the GPS satellite and calculate a current location of the electronic device 1000. The location information of the electronic device 1000 may access a particular application according to access rights. If the corresponding application is isolated, access to the location information may be blocked.

The inputter 700 may receive a user input and transmit the user input to the processor 200. The inputter 700 may include, for example, a touch sensor, a (digital) pen sensor, a pressure sensor, and a key. The touch sensor may, for example, use at least one of electrostatic, pressure-sensitive, infrared, or ultrasonic methods. The (digital) pen sensor may, for example, be part of a touch panel or may include a separate recognition sheet. The key may include, for example, a physical button, an optical key, or a keypad.

The camera 800 is configured to capture a still image or a moving image under the control of a user. The camera 800 may be implemented as a plurality of cameras, such as a front camera and a rear camera. The photo, a moving image, or the like, captured by the camera 800 may access a specific application according to the access authority. If the corresponding application is isolated, access to the photo or moving image may be blocked.

The microphone 900 may generate (or convert) a voice or sound received from the outside into an electrical signal. The electrical signal generated by the microphone 900 may be stored in the memory 100 or output through the speaker 500. The microphone 900 may include one or more microphones.

The description of the memory 100 and the processor 200 may refer to the description of the memory 100 and the processor 200 of FIG. 3.

The processor 200 may include a random access memory (RAM) 210, a read-only memory (ROM) 220, a main central processing unit (CPU) 230, a graphic processing unit 240, and a bus 250. The RAM 210, the ROM 220, the main CPU 230, the GPU 240, or the like, may be interconnected through the bus 250.

The CPU 230 may perform booting using the O/S stored in the memory 100 by accessing the memory 100. The CPU 230 may perform various operations using various programs, content, data, or the like.

The ROM 220 stores an instruction set for booting the system and the like. When the turn-on instruction is input and power is supplied, the CPU 230 copies the OS stored in the memory 100 to the RAM 210 according to the stored one or more instructions in the ROM 220, and executes the OS to boot the system. When the booting is completed, the CPU 230 copies various programs stored in the memory 100 to the RAM 210, executes the program copied to the RAM 210, and performs various operations. The GPU 240, when booting of the electronic device 1000 is completed, may display UI corresponding to the application stored in the memory 100 and UI elements on the display 400.

Figure 8:
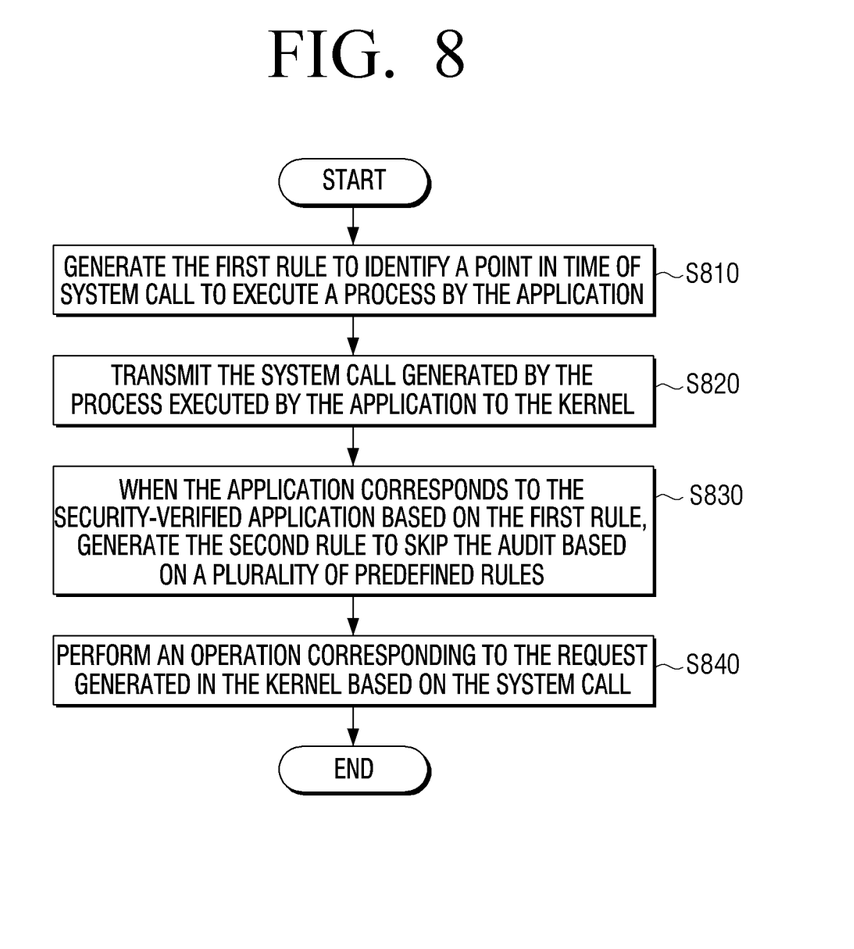
FIG. 8 is a flowchart illustrating a control method of an electronic device according to an embodiment.

FIG. 8 is a flowchart illustrating a control method of an electronic device according to an embodiment.

Referring to FIG. 8, the electronic device 1000 may generate the first rule to identify a point in time of system call to execute a process by the application in operation S810.

The electronic device 1000 may add the first rule prior to the plurality of predefined rules to the audit system.

The system call generated by the process executed by the application may be forwarded to the kernel in operation S820.

When the application corresponds to the security-verified application based on the first rule, the second rule to skip the audit based on a plurality of predefined rules may be generated in operation S830.

The first rule may include a rule to issue a log when a system call is performed to execute the process by the application, and when the log for the system call is generated based on the first rule, the second rule may be generated.

The electronic device 1000 may skip audit based on the plurality of predefined rules according to the second rule, when the log by the system call is generated by the first rule.

When it is identified that the application corresponds to the security-verified application by the first rule, audit based on the plurality of predefined rules may be skipped according to the second rule by adding the second rule prior to the plurality of predefined rules.

The electronic device 1000 may perform an operation corresponding to the request generated in the kernel based on the system call in operation S840.

The electronic device 1000 may perform the security verification for at least one application stored in the electronic device 1000. A list including at least one security-verified application among at least one application may be generated and stored in the electronic device.

The electronic device 1000 may identify whether the application executing the process corresponds to the security-verified application based on the list.

The electronic device 1000 may generate a third rule for monitoring the modulation for the at least one security-verified application included in the list. If the modulation for the application is identified according to the third rule, the information on the application identified by the modulation may be deleted from the list.

The electronic device 1000 may generate the third rule for generating a log when the modulation is identified for at least one security-verified application included in the list, and identify that the application included in the log generated according to the third rule, among the at least one application included in the list, has been modulated.

The control method may be implemented as a program including an algorithm executable in a computer and a program may be stored in a non-transitory computer readable medium and provided.

The non-transitory computer readable medium may refer, for example, to a medium that stores data, such as a register, a cache, a memory or etc., and is readable by an apparatus. For example, the aforementioned various applications, instructions, or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

The foregoing example embodiments and advantages are merely examples and are not to be understood as limiting the disclosure. The present teachings may be readily applied to other types of devices. Also, the description of the embodiments of the disclosure is intended to be illustrative, and not to limit the scope of the claims, and many alternatives, modifications, and variations will be apparent to those skilled in the art.

What is claimed is:

1. An electronic device comprising:
   a memory configured to store a kernel and at least one application; and
   a processor configured to, based on a system call generated by a process executed by the application being transmitted to the kernel, execute the application to cause the application to perform an operation corresponding to a request generated by the kernel based on the system call,
   wherein the kernel is configured to perform an audit for the system call based on a plurality of predefined rules,
   wherein the processor is further configured to:
      generate a first rule to identify a point in time of a system call generated by the application to perform the process,
      identify whether the application corresponds to a security-verified application based on the first rule,
      based on the application corresponding to the security-verified application, generate a second rule to skip the audit based on the plurality of predefined rules,
      perform security verification for at least one application stored in the memory,
      generate a list including information about the at least one security-verified application, among the at least one application,
      store the list in the memory,
      generate a third rule to monitor modulation for at least one security-verified application stored in the list, and
      based on modulation for the application being identified according to the third rule, delete information about the application of which modulation is identified from the list, and
   wherein the modulation of the application is a modulation of binary code of the file associated with execution of the application is changed by an unauthorized user or system.

2. The electronic device of claim 1, wherein the processor is further configured to, based on a log for the system call being generated by the first rule, skip the audit based on the plurality of predefined rules according to the second rule.

3. The electronic device of claim 1, wherein the processor is further configured to:
   add the first rule prior to the plurality of predefined rules; and
   based on identification that the application corresponds to the security-verified application by the first rule, add the second rule prior to the plurality of predefined rules to skip the audit based on the plurality of predefined rules by the second rule.

4. The electronic device of claim 1,
   wherein the first rule comprises a rule of generating a log based on the application performing the system call to perform the process, and
   wherein the processor is further configured to, based on the log for the system call being generated based on the first rule, generate the second rule.

5. The electronic device of claim 1, wherein the processor is further configured to identify whether the application performing the process corresponds to the security-verified application based on the list.

6. The electronic device of claim 1, wherein the processor is further configured to:
   generate the third rule to generate a log, based on the modulation for the at least one security-verified application included in the list being identified; and
   identify that the application included in the log generated according to the third rule, among the at least one security-verified application included in the list, is modulated.

7. A control method of an electronic device, the method comprising:
   generating a first rule to identify a point in time of a system call generated by an application to perform a process;
   transmitting a system call generated by the process executed by the application to a kernel;
   based on the application corresponding to the security-verified application based on the first rule, generating a second rule to skip an audit based on a plurality of predefined rules; and
   performing an operation corresponding to a request generated by the kernel based on the system call,
   wherein the kernel is configured to perform an audit for the system call based on a plurality of predefined rules,
   wherein the method further comprises:
      performing security verification for at least one application stored in the memory;
      generating a list including information about the at least one security-verified application, among the at least one application;
      storing the list in the memory;
      generating a third rule to monitor modulation for at least one security-verified application stored in the list; and
      based on modulation for the application being identified according to the third rule, deleting information about the application of which modulation is identified from the list, and
   wherein the modulation of the application is a modulation of binary code of the file associated with execution of the application is changed by an unauthorized user or system.

8. The method of claim 7, further comprises:
based on the log for the system call being generated by the first rule, skipping the audit based on the plurality of predefined rules according to the second rule.

9. The method of claim 7, further comprises:
adding the first rule prior to the plurality of predefined rules; and
based on identification that the application corresponds to the security-verified application by the first rule, adding the second rule prior to the plurality of predefined rules to skip the audit based on the plurality of predefined rules according to the second rule.

10. The method of claim 7,
wherein the first rule comprises a rule of generating a log based on the application performing the system call to perform the process, and
wherein the generating the second rule comprises, based on the log for the system call being generated based on the first rule, generating the second rule.

11. The method of claim 7, further comprising:
identifying whether the application performing the process corresponds to the security-verified application based on the list.

* * * * *